United States Patent
Lee

(10) Patent No.: US 8,554,884 B2
(45) Date of Patent: Oct. 8, 2013

(54) SETTING AND MODIFYING METHOD OF USER OPERATING INTERFACE FOR USE IN DIGITAL AUDIO/VIDEO PLAYBACK SYSTEM

(75) Inventor: Tung-Chou Lee, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 503 days.

(21) Appl. No.: 12/728,452

(22) Filed: Mar. 22, 2010

(65) Prior Publication Data

US 2010/0241967 A1 Sep. 23, 2010

(30) Foreign Application Priority Data

Mar. 23, 2009 (TW) .............................. 98109388 A

(51) Int. Cl.
*G06F 15/177* (2006.01)
(52) U.S. Cl.
USPC ............... 709/221; 725/39; 725/56; 725/137; 345/204
(58) Field of Classification Search
USPC ........................................ 709/221
See application file for complete search history.

(56) References Cited

U.S. PATENT DOCUMENTS

| 7,134,133 B1 * | 11/2006 | Wugofski ........................ 725/39 |
| 2001/0050679 A1 * | 12/2001 | Shigeta .......................... 345/204 |
| 2003/0070171 A1 * | 4/2003 | Jeon et al. ....................... 725/56 |
| 2007/0234397 A1 * | 10/2007 | Pearson et al. ................ 725/137 |

FOREIGN PATENT DOCUMENTS

| CN | 1719406 A | 1/2006 |
| CN | 1941862 A | 4/2007 |
| CN | 101212599 A | 7/2008 |
| TW | 200531549 | 9/2005 |
| TW | 200534707 | 10/2005 |

* cited by examiner

*Primary Examiner* — Hua Fan
(74) *Attorney, Agent, or Firm* — WPAT, PC; Justin King

(57) ABSTRACT

A setting and modifying method of a user operating interface is used between a user device and a digital audio/video signal receiving and processing device through a network. The setting and modifying method includes the following steps. Firstly, the user device acquires a first user operating interface setting information from the digital audio/video signal receiving and processing device. Then, the contents of the first user operating interface setting information are modified to generate a second user operating interface setting information. Afterwards, the second user operating interface setting information is transmitted from the user device to the digital audio/video signal receiving and processing device through the network for setting the user operating interface.

11 Claims, 7 Drawing Sheets

SETTING AND MODIFYING METHOD OF USER OPERATING INTERFACE FOR USE IN DIGITAL AUDIO/VIDEO PLAYBACK SYSTEM

FIELD OF THE INVENTION

The present invention relates to a setting and modifying method of a user operating interface, and more particularly to a setting and modifying method of a user operating interface for use between a user device and a digital audio/video signal receiving and processing device through a network.

BACKGROUND OF THE INVENTION

A digital audio/video signal receiving and processing device is a device for receiving digital signals (e.g. images and sounds of digitalized TV programs) and decoding the digital signals for playback. An example of the digital audio/video signal receiving and processing device includes a digital set-top box (digital STB), a digital television, a media player, or the like. The images and sounds of TV programs have been previously digitalized and compressed by a TV station. The digitalized and compressed TV signals are transmitted to a digital television at the user's home for playback. Alternatively, the digitalized and compressed TV signals are transmitted to a TV system having a digital STB and decoded into analog TV signals for playback.

FIG. 1 is a schematic functional block diagram illustrating a digital audio/video playback system according to the prior art. As shown in FIG. 1, the digital audio/video playback system 1 comprises a TV signal source 13, a network 12, a digital set-top box (digital STB) 11 and a TV set 10. The TV set 10 may only receive analog signals. The digital STB 11 has a function of connecting to the network 12. After the TV set 10 is in communication with the digital STB 11 and the digital STB 11 is connected to the network 12, a series of digitalized TV signals that are provided by the TV signal source 13 will be transmitted to the digital STB 11 through the network 12. By the digital STB 11, the digitalized TV signals are decoded and then displayed on the TV set 10. For a digital television, the function of the digital STB 11 is integrated into the TV set 10 and the TV set 10 can directly receive the images and sounds of digitalized TV programs that are issued by the TV signal source 13. By processing the digitalized TV signals, associated noise and interference may be eliminated, and thus the outputted image becomes sharper and has better definition. In addition, the outputted image could be shown in a more attractive manner such as a POP (picture on picture) mode, a PIP (picture in picture), or a frame-freeze and zoom-in function.

By using the digital television or the digital STB to watch digitalized TV programs, the sharp and high-definition images are viewed. In addition, since the TV signals have been compressed during the digitalization process, the size of the digital signals associated with a TV program significantly decreases. As a consequence, more TV programs through more TV channels could be transmitted. Moreover, the TV signal source may provide more real-time information, value-added services and an interactive platform with the user. Generally, a user operating interface is provided for facilitating the user to operate the digital television or the digital STB. Since the digital television or the digital STB provides diversified functions, the functional items of the user operating interface would be excessive and quite complex. Since the user operating interface of the digital television or the digital STB is standardized, the user needs to select a desired function and a desired TV program among the complicated functional items and abundant contents of TV programs. In other words, the complicated user operating interface hinders the user of the digital television or the digital STB, particularly for the elderly users, children or uneducated users.

Therefore, there is a need of providing a setting and modifying method of a user operating interface so as to obviate the drawbacks encountered from the prior art.

SUMMARY OF THE INVENTION

An aspect of the present invention provides a setting and modifying method of a user operating interface for use between a user device and a digital audio/video signal receiving and processing device through a network. The setting and modifying method includes the following steps. Firstly, the user device acquires a first user operating interface setting information from the digital audio/video signal receiving and processing device. Then, the contents of the first user operating interface setting information are modified to generate a second user operating interface setting information. Afterwards, the second user operating interface setting information is transmitted from the user device to the digital audio/video signal receiving and processing device through the network for setting the user operating interface.

Another aspect of the present invention provides a digital audio/video playback system for use with a network. The digital audio/video playback system includes a digital audio/video signal receiving and processing device providing a user operating interface, and a user device. The digital audio/video signal receiving and processing device is in communication with the network for receiving a digital audio/video signal through the network, and decoding the digital audio/video signal for playback. The user device is in communication with the network for acquiring a first user operating interface setting information from the digital audio/video signal receiving and processing device, and modifying contents of the first user operating interface setting information to generate a second user operating interface setting information. The second user operating interface setting information is transmitted from the user device to the digital audio/video signal receiving and processing device through the network for setting the user operating interface.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
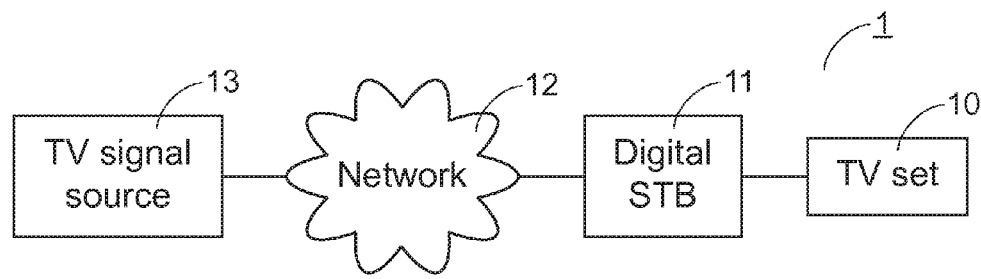
FIG. 1 is a schematic functional block diagram illustrating a digital audio/video playback system according to the prior art.
Figure 2A:
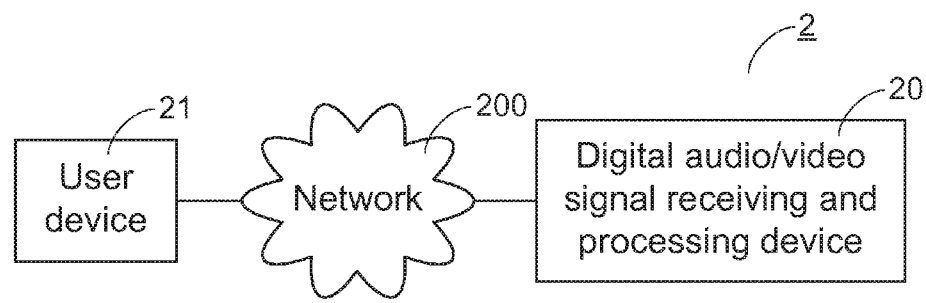
FIGS. 2A and 2B are schematic functional block diagrams illustrating a digital audio/video playback system according to an embodiment of the present invention.
Figure 2B:
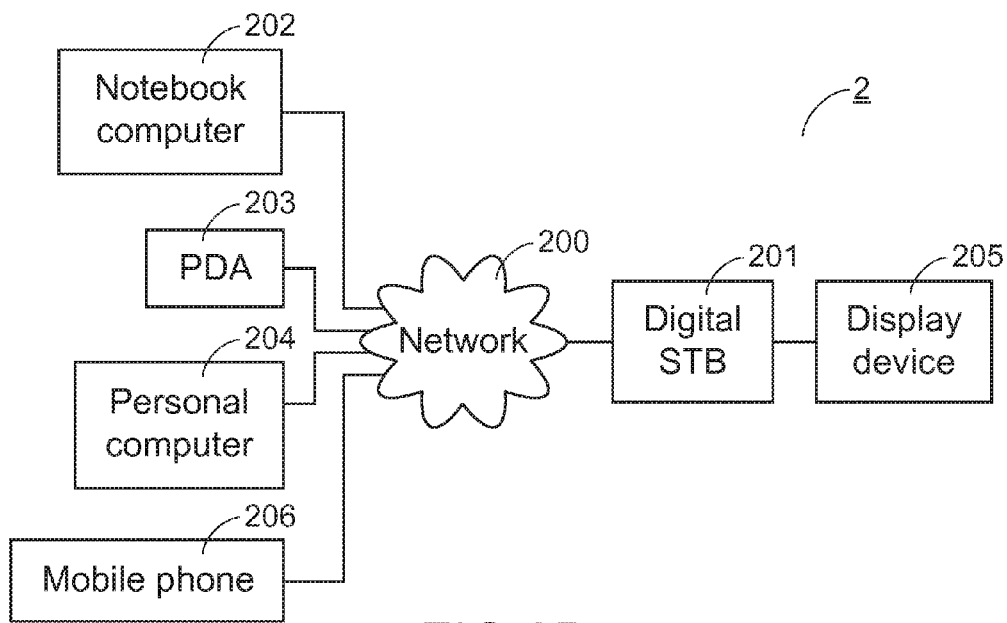

FIGS. 2A and 2B are schematic functional block diagrams illustrating a digital audio/video playback system according to an embodiment of the present invention.

As shown in FIG. 2A, the digital audio/video playback system 2 is used with a network 200. The digital audio/video playback system 2 comprises a digital audio/video signal receiving and processing device 20 and a user device 21. The digital audio/video signal receiving and processing device 20 is in communication with the network 200. Through the network 200, the digital audio/video signal receiving and processing device 20 receives a digital audio/video signal, which is decoded and then outputted for playback. The digital audio/video signal receiving and processing device 20 provides a user operating interface (not shown) to allow the user to select the outputs of the digital audio/video signal receiving and processing device 20 through the user operating interface. The user device 21 is in communication with the network 200. When a first user operating interface setting information is transmitted from the digital audio/video signal receiving and processing device 20 to the user device 21, the user device 21 may modify the contents of the first user operating interface setting information, thereby generating a second user operating interface setting information. Through the network 200, the second user operating interface setting information is transmitted from the user device 21 to the digital audio/video signal receiving and processing device 20 for setting the user operating interface.

As shown in FIG. 2B, an example of the digital audio/video signal receiving and processing device 20 includes a digital set-top box (digital STB) 201. The user device 21 is a notebook computer 202, a personal digital assistant (PDA) 203, a personal computer 204 or a mobile phone 206, which is in communication with the network 200. In addition, the digital STB 201 is also in communication with a display device 205. An example of the display device 205 includes a TV set or a computer monitor. Through the network 200, the digital STB 201 receives a digital audio/video signal, which is decoded and then displayed on the display device 205. In accordance with a key feature of the present invention, a user operating interface setting information provided by the digital STB 201 could be acquired by any one of the notebook computer 202, the PDA 203, the personal computer 204 and the mobile phone 206 through the network 200. The contents of the user operating interface setting information stored in digital STB 201 may be modified via the notebook computer 202, the PDA 203, the personal computer 204 or the mobile phone 206. Through the network 200, the modified user operating interface setting information is then transmitted to the digital STB 201 for setting the user operating interface. As such, after the user device is connected with the network 200, the contents of the user operating interface setting information stored in the digital STB 201 may be easily modified or edited via the user device. Several exemplary digital audio/video playback systems will be illustrated as follows.

Figure 3A:
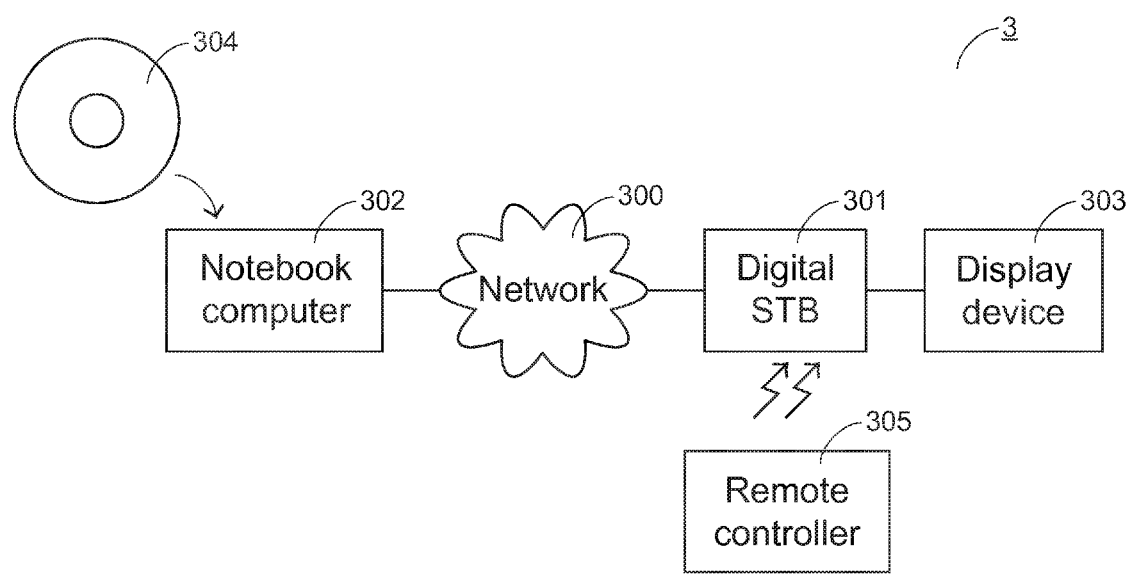
FIG. 3A is a schematic functional block diagram illustrating a first exemplary digital audio/video playback system of the present invention.

FIG. 3A is a schematic functional block diagram illustrating a first exemplary digital audio/video playback system of the present invention. The digital audio/video signal receiving and processing device used in the first exemplary digital audio/video playback system 3 includes a digital set-top box (digital STB) 301, which is in communication with a display device 303. The digital STB 301 provides a user operating interface (not shown) to allow the user to select desired TV programs through the user operating interface shown on the display device 303. The user device of this embodiment is a notebook computer 302. In addition, a user operating interface editing program 304 is installed in the notebook computer 302. The user operating interface editing program 304 includes a default user operating interface setting information provided by the digital STB 301. When the user operating interface editing program 304 is executed in the notebook computer 302, the user may modify or edit the contents of the user operating interface setting information via an editing interface (not shown) provided by the user operating interface editing program 304. Once the notebook computer 302 and the digital STB 301 are in communication with the network 300, the modified user operating interface setting information will be transmitted from the notebook computer 302 to the digital STB 301 for setting the user operating interface. On the other hand, if the notebook computer 302 fails to communicate with the digital STB 301 through the network 300, the modified user operating interface setting information may be stored in the notebook computer 302 and wait to be uploaded. Alternatively, the modified user operating interface setting information may be stored in a portable storage device (e.g. a USB flash drive), and then the portable storage device or the notebook computer is connected with the digital STB 301 to transmit the modified user operating interface setting information to the digital STB 301. Moreover, after the modified user operating interface setting information is received by the digital STB 301, the modified user operating interface setting information may be stored in the digital STB 301. In this circumstance, the default operating interface setting information is not replaced with the modified user operating interface setting information.

Once the user intends to set the user operating interface, the digital STB 301 makes the display device 303 to show a user operating interface setting selection menu. By using a remote controller 305 appended to the digital STB 301, the user may select one between the modified user operating interface setting information and the default user operating interface setting information. Alternatively, the digital STB 301 may provide a user operating interface preview function. By executing the user operating interface preview function, the contents of the modified user operating interface setting information will be previewed on the display device 303.

Figure 3B:
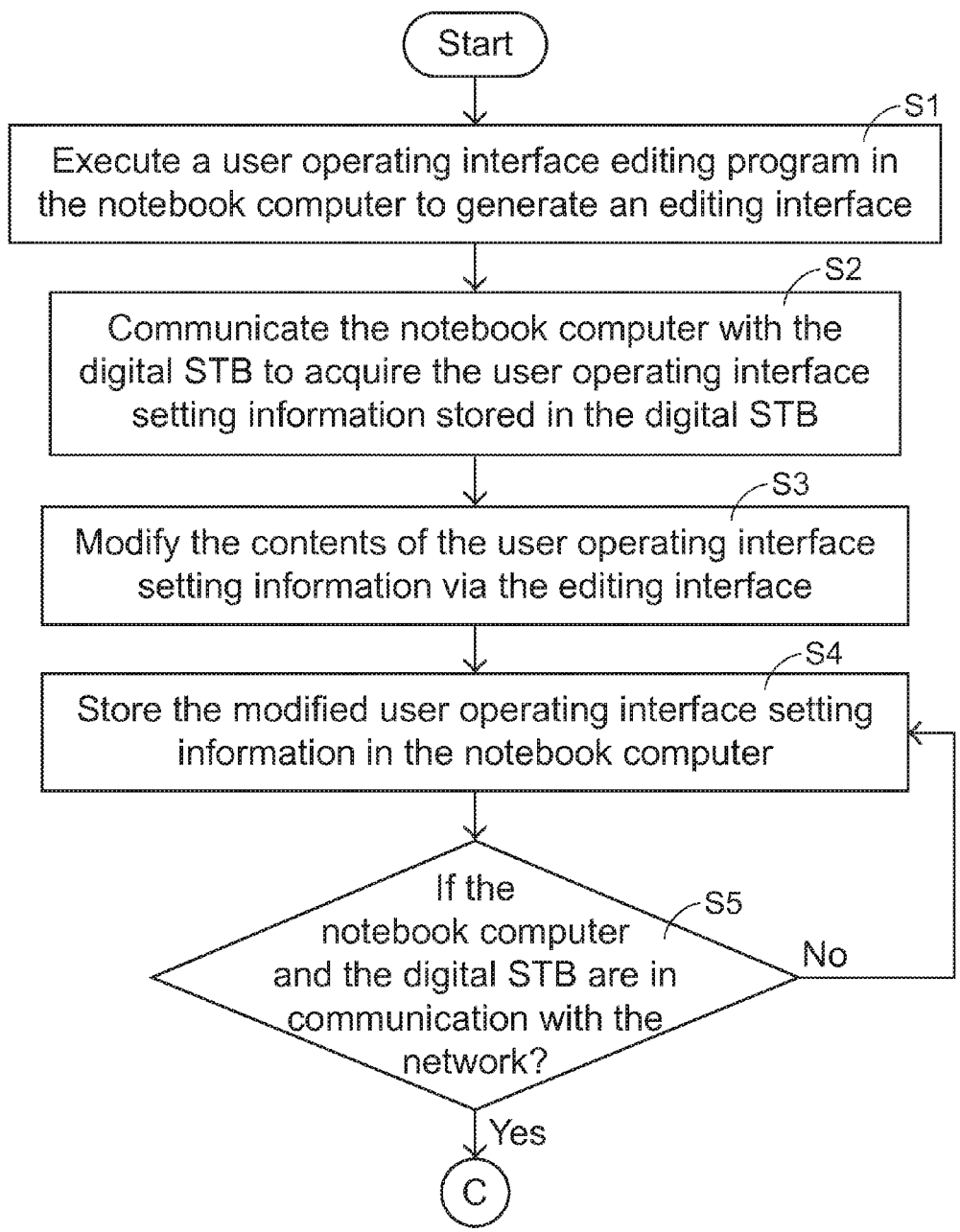
FIGS. 3B and 3C schematically illustrate a flowchart of a method for setting and modifying the user operating interface of the first exemplary digital audio/video playback system of the present invention.
Figure 3C:
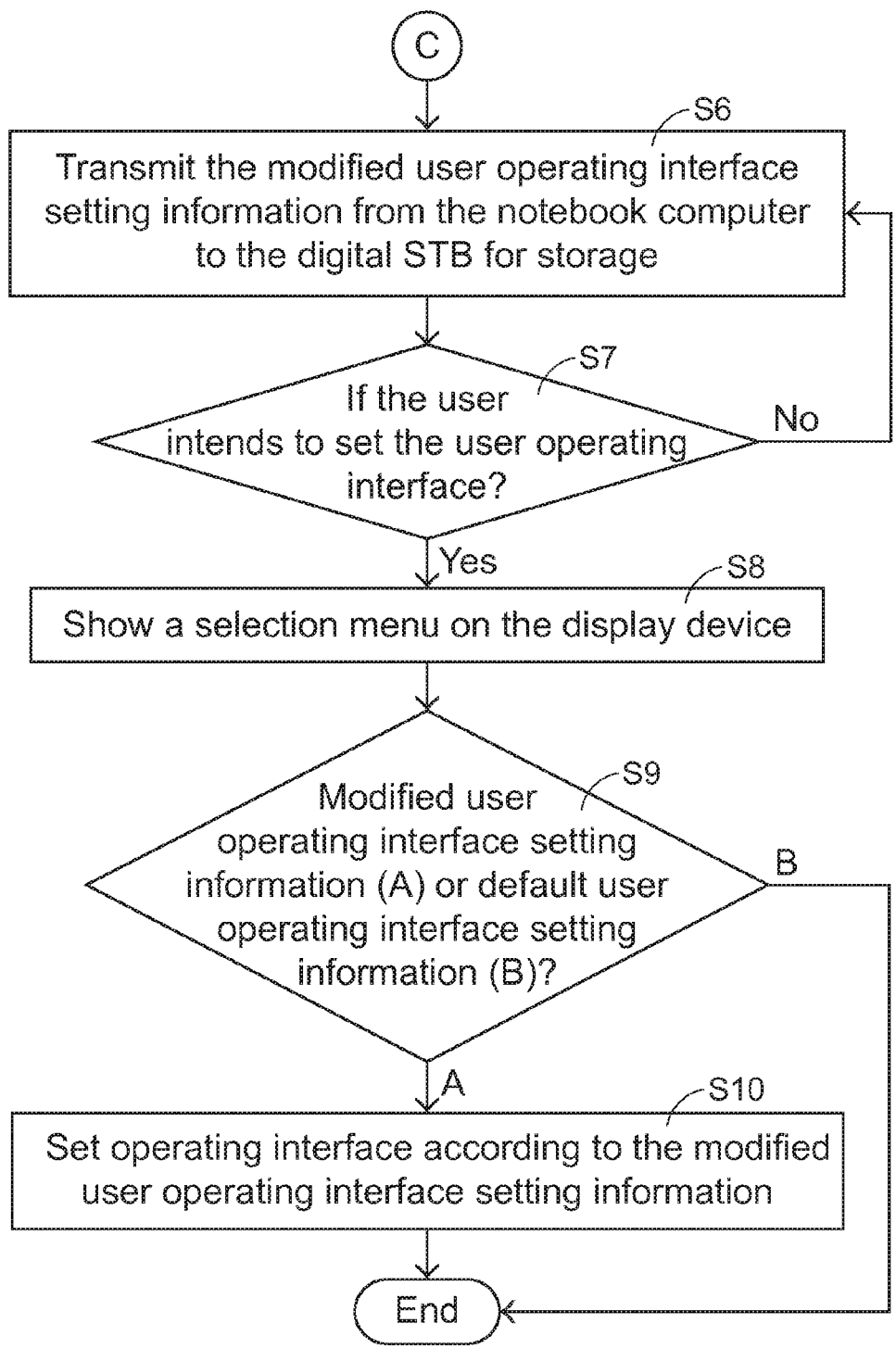

FIGS. 3B and 3C schematically illustrate a flowchart of a method for setting and modifying the user operating interface of the first exemplary digital audio/video playback system of the present invention. First of all, a user operating interface editing program 304 is executed in the notebook computer 302 so as to generate an editing interface (Step S1). Then, the notebook computer 302 is in communication with the digital STB 301, so that the contents of the user operating interface setting information stored in the digital STB 301 are acquired by the notebook computer 302 (Step S2). Via the editing interface, the contents of the user operating interface setting information are modified to result in a modified user operating interface setting information (Step S3). Then, the modified user operating interface setting information is stored in the notebook computer 302 (Step S4). Then, it is determined whether the notebook computer 302 and the digital STB 301 are in communication with the network 300 (Step S5). Once the notebook computer 302 and the digital STB 301 are in communication with the network 300, the modified user operating interface setting information will be transmitted from the notebook computer 302 to the digital STB 301 for storage (Step S6). Then, it is determined whether the user intends to set the user operating interface (Step S7). Once the user intends to set the user operating interface, a user operating interface setting selection menu is shown on the display device 303 through the digital STB 301 (Step S8). Then, it is determined which one of the modified user operating interface setting information (A) and the default user operating interface setting information (B) is selected (Step S9). Once the modified user operating interface setting information is selected, the user operating interface provided by the digital STB 301 is set according to the modified user operating interface setting information (Step S10). Alternatively, once the notebook computer 302 and the digital STB 301 are in communication with the network 300 in the Step S5, the user operating interface provided by the digital STB 301 may be automatically set according to the modified user operating interface setting information transmitted from the notebook computer 302 without further selection or confirmation.

After the above setting steps, a user-friendlier user operating interface is shown on the digital STB 301. For example, for facilitating the elderly users or children to execute a video-on-demand function, a favorite program playlist contained in a sub-menu may be moved to the start-up frame. As a consequence, the user unfamiliar with the complicated user operating interface could choose a desired TV program from the favorite program playlist on the start-up frame. Under this circumstance, the problems encountered from the prior art will be obviated.

Figure 4A:
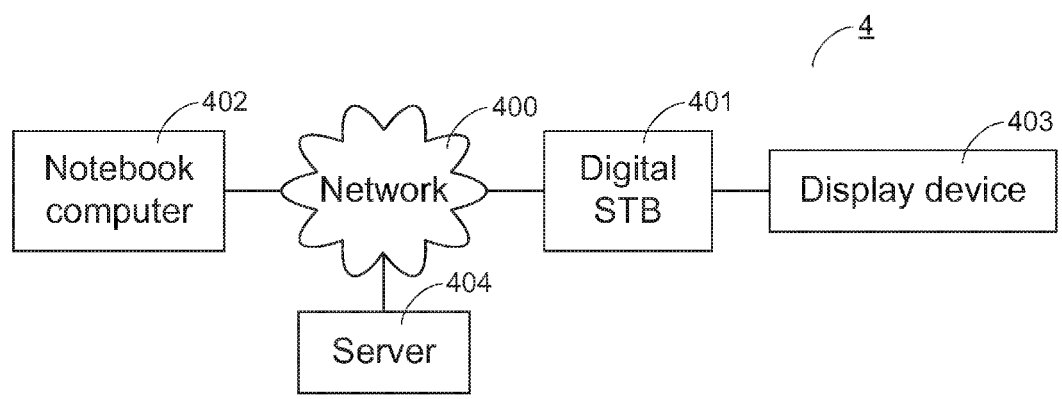
FIG. 4A is a schematic functional block diagram illustrating a second exemplary digital audio/video playback system of the present invention.

FIG. 4A is a schematic functional block diagram illustrating a second exemplary digital audio/video playback system of the present invention. The digital audio/video signal receiving and processing device used in the second exemplary digital audio/video playback system 4 includes a digital set-top box (digital STB) 401, which is in communication with a display device 403. The digital STB 401 provides a user operating interface (not shown) to allow the user to select desired TV programs through the user operating interface shown on the display device 40. The user device of this embodiment is a notebook computer 402. Through the network 400, the notebook computer 402 logins into the server 404. The default user operating interface setting information provided by the digital STB 401 is stored in the server 404. Via a user operating interface setting web page (not shown) provided by the server 404, the contents of the default user operating interface setting information in the digital STB 401 are modified by the notebook computer 402 to result in a modified user operating interface setting information. Then, the modified user operating interface setting information is transmitted to the digital STB 401 for setting the user operating interface. If the digital STB 401 fails to communicate with the network 400, the modified user operating interface setting information may be stored in the server 404 and wait to be uploaded. After the modified user operating interface setting information is received by the digital STB 401, the further steps are similar to those illustrated in the first embodiment, and are not redundantly described herein.

Figure 4B:
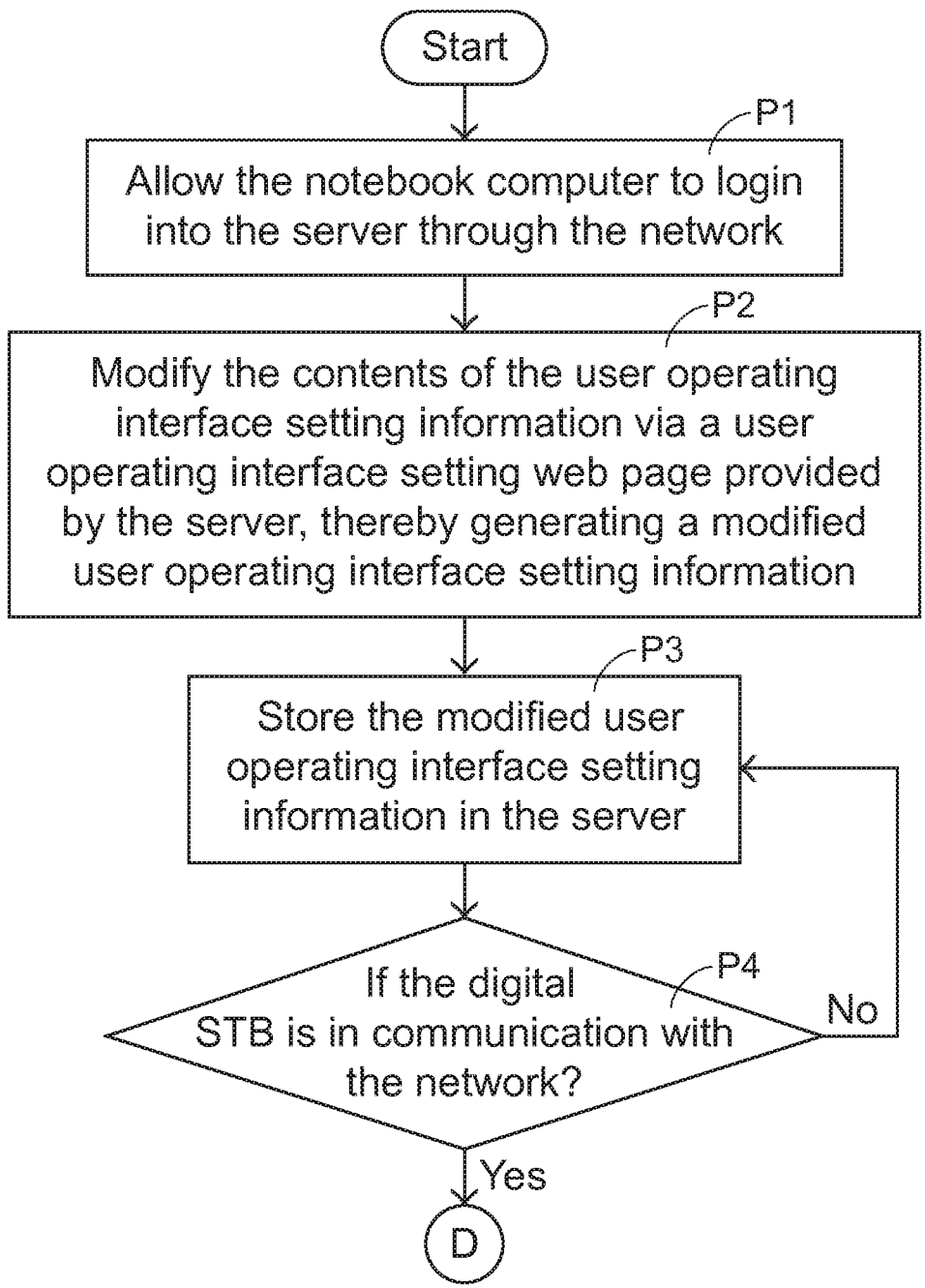
FIGS. 4B and 4C schematically illustrate a flowchart of a method for setting and modifying the user operating interface of the second exemplary digital audio/video playback system of the present invention.
Figure 4C:
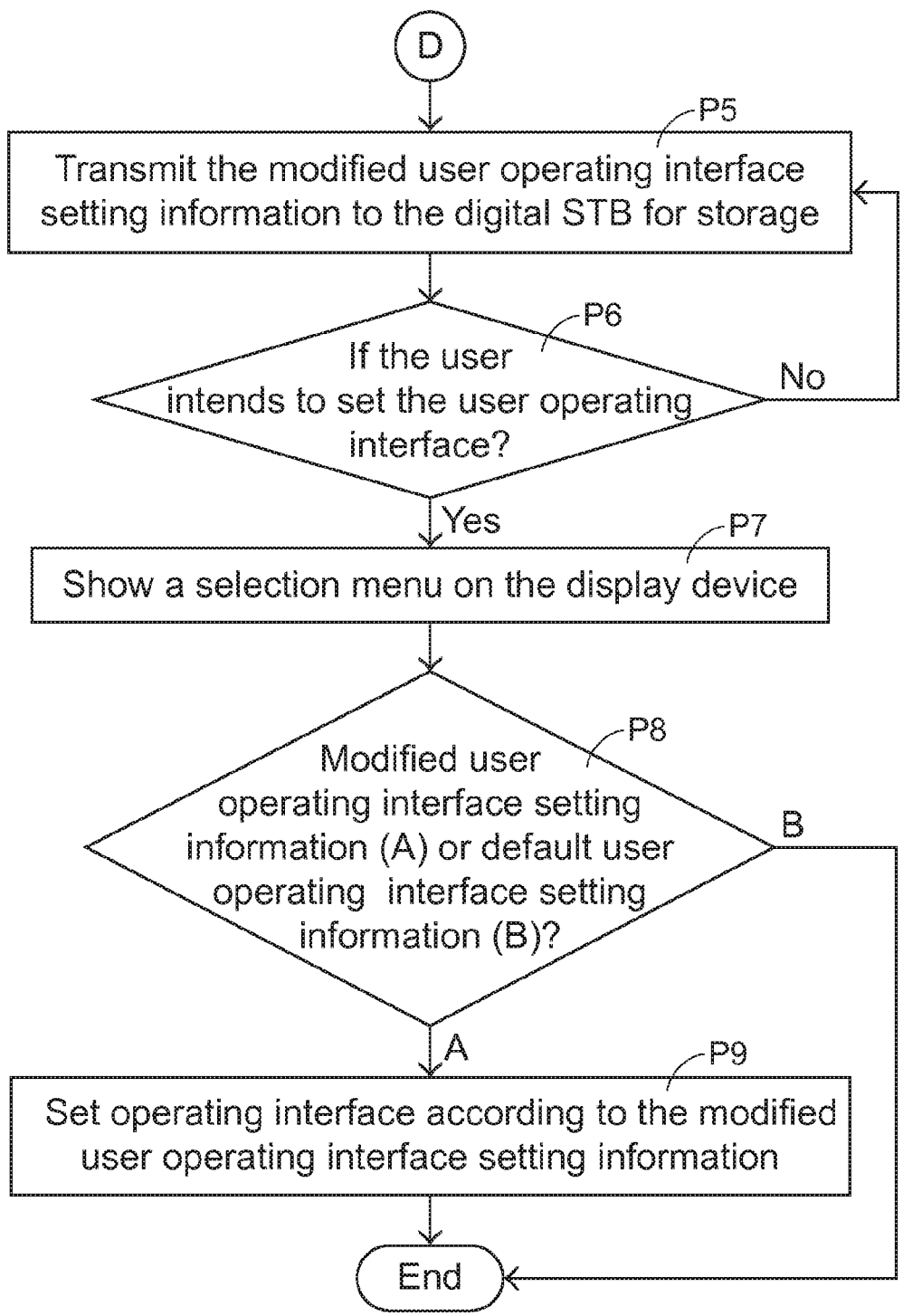

FIGS. 4B and 4C schematically illustrate a flowchart of a method for setting and modifying the user operating interface of the second exemplary digital audio/video playback system of the present invention. First of all, the notebook computer 402 logins into the server 404 through the network 400 (Step P1). Then, via a user operating interface setting web page provided by the server 404, the contents of default user operating interface setting information in the digital STB 401 are modified to result in a modified user operating interface setting information (Step P2). Then, the modified user operating interface setting information is stored in the server 404 (Step P3). Then, it is determined whether the digital STB 401 is in communication with the network 400 (Step P4). Once the digital STB 401 is in communication with the network 400, the modified user operating interface setting information is transmitted from the server 404 to the digital STB 401 for storage (Step P5). Then, it is determined whether the user intends to set the user operating interface (Step P6). Once the user intends to set the user operating interface, a user operating interface setting selection menu is shown on the display device 403 through the digital STB 401 (Step P7). Then, it is determined which one of the modified user operating interface setting information (A) and the default user operating interface setting information (B) is selected (Step P8). Once the modified user operating interface setting information is selected, the user operating interface provided by the digital STB 401 is set according to the modified user operating interface setting information (Step P9). Alternatively, once the digital STB 401 is in communication with the network 400 in the Step P4, the user operating interface provided by the digital STB 401 may be automatically set according to the modified user operating interface setting information transmitted from the server 404 without further selection or confirmation.

It is to be noted that the present invention is not limited to be applied to modify user operating interface setting information stored in digital STB although the digital STB is taken as an example of the digital audio/video signal receiving and processing device in the embodiments. The digital audio/video signal receiving and processing device may be, for example a TV stick, a Slingbox, or even an iPad system, which receives and processes digital audio/video signals and provides user operating interface to be operated by the user.

From the above description, the setting and modifying method of a user operating interface and the digital audio/video playback system according to the present invention are capable of facilitating the elderly users, children or uneducated users to operate the user operating interface. As a consequence, the drawbacks encountered from the prior art will be obviated.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A setting and modifying method of a user operating interface for use between a user device and a digital audio/video signal receiving and processing device through a network, the setting and modifying method comprising steps of:

making the user device acquire a first user operating interface setting information of the digital audio/video signal receiving and processing device, wherein the digital audio/video signal receiving and processing device is a digital set-top box or a digital television, and modifying the contents of the first user operating interface setting information to generate a second user operating interface setting information;

transmitting the second user operating interface setting information from the user device to the digital audio/video signal receiving and processing device through the network and storing the second user operating interface setting information in the digital audio/video signal receiving and processing device;

providing a user operating interface setting selection menu by the digital audio/video signal receiving and processing device; and reading out the second user operating interface setting information from the digital audio/video signal receiving and processing device in response to a selection from the user operating interface setting selection menu, and setting the user operating interface according to the second user operating interface setting information, wherein the digital audio/video signal receiving and processing device further provides a user operating interface preview function to preview the contents of the second user operating interface setting information.

2. The setting and modifying method according to claim 1 wherein the step of generating the second user operating interface setting information further comprises steps of:

executing a user operating interface editing program in the user device, thereby generating an editing interface; and modifying the contents of the first user operating interface setting information via the editing interface, thereby generating the second user operating interface setting information.

3. The setting and modifying method according to claim 2 further comprising steps of:

storing the second user operating interface setting information in the user device; and previewing the contents of the second user operating interface setting information.

4. The setting and modifying method according to claim 1 wherein the step of generating the second user operating interface setting information further comprises steps of:

making the user device login into a server through the network; and modifying the contents of the first user operating interface setting information via a user operating interface setting web page provided by the server, thereby generating the second user operating interface setting information.

5. The setting and modifying method according to claim 4 further comprising steps of:

storing the second user operating interface setting information in the server; and previewing the contents of the second user operating interface setting information.

6. The setting and modifying method according to claim 1 wherein the user device is a notebook computer, a personal digital assistant, a personal computer or a mobile phone, which is communicable with the network.

7. A digital audio/video playback system for use with a network, the digital audio/video playback system comprising:

a digital audio/video signal receiving and processing device in communication with the network to receive a digital audio/video signal through the network and decode the digital audio/video signal for playback, the digital audio/video signal receiving and processing device providing a user operating interface, wherein the digital audio/video signal receiving and processing device is a digital set-top box or a digital television; and a user device in communication with the network to acquire a first user operating interface setting information of the digital audio/video signal receiving and processing device, and modify the contents of the first user operating interface setting information to generate a second user operating interface setting information, wherein the second user operating interface setting information is transmitted from the user device to the digital audio/video signal receiving and processing device through the network and stored in the digital audio/video signal receiving and processing device, wherein the digital audio/video signal receiving and processing device provides a user operating interface setting selection menu, and the user operating interface is set according to the second user operating interface setting information in response to a selection from the user operating interface setting selection menu, wherein the digital audio/video signal receiving and processing device further provides a user operating interface preview function to preview the contents of the second user operating interface setting information.

8. The digital audio/video playback system according to claim 7 wherein the user device executes a user operating interface editing program to generate an editing interface, the contents of the first user operating interface setting information are modified by the user device via the editing interface to generate the second user operating interface setting information, and the second user operating interface setting information is stored in the user device.

9. The digital audio/video playback system according to claim 7, further comprising a server in communication with the network to provide a user operating interface setting web page, wherein when the user device logins into the server through the network, the user device modifies the contents of the first user operating interface setting information via the user operating interface setting web page, thereby generating the second user operating interface setting information, wherein the second user operating interface setting information is further stored in the server.

10. The digital audio/video playback system according to claim 7 wherein the digital audio/video signal receiving and processing device further comprises a remote controller for selecting from the user operating interface setting selection menu or selecting the user operating interface preview function.

11. The digital audio/video playback system according to claim 7 wherein the user device is a notebook computer, a personal digital assistant, a personal computer or a mobile phone, which is communicable with the network.

* * * * *